(12) United States Patent
Winig

(10) Patent No.: US 8,250,360 B2
(45) Date of Patent: Aug. 21, 2012

(54) CONTENT BASED ROUTING WITH HIGH ASSURANCE MLS

(75) Inventor: Robert J. Winig, Rancho Palos Verdes, CA (US)

(73) Assignee: The Boeing Company, Chicago, IL (US)

(*) Notice: Subject to any disclaimer, the term of this patent is extended or adjusted under 35 U.S.C. 154(b) by 1038 days.

(21) Appl. No.: 11/564,729

(22) Filed: Nov. 29, 2006

(65) Prior Publication Data

US 2008/0126799 A1    May 29, 2008

(51) Int. Cl.
*G06F 21/00* (2006.01)

(52) U.S. Cl. ............. 713/154; 726/1; 713/166; 380/33; 709/232; 709/238; 455/428; 705/338

(58) Field of Classification Search .................. 713/154, 713/166
See application file for complete search history.

(56) References Cited

U.S. PATENT DOCUMENTS

| | | | | |
|---|---|---|---|---|
| 5,862,325 | A * | 1/1999 | Reed et al. | 709/201 |
| 6,959,288 | B1 * | 10/2005 | Medina et al. | 705/51 |
| 7,251,681 | B1 * | 7/2007 | Gourlay | 709/214 |
| 7,487,128 | B2 * | 2/2009 | Spagna et al. | 705/51 |
| 7,685,106 | B2 * | 3/2010 | Brooks et al. | 707/999.003 |
| 2002/0107807 | A1 * | 8/2002 | Ketonen et al. | 705/51 |
| 2003/0099237 | A1 * | 5/2003 | Mitra et al. | 370/393 |
| 2003/0105979 | A1 * | 6/2003 | Itoh et al. | 713/201 |
| 2003/0120817 | A1 * | 6/2003 | Ott et al. | 709/249 |
| 2003/0188183 | A1 * | 10/2003 | Lee et al. | 713/200 |
| 2003/0196108 | A1 * | 10/2003 | Kung | 713/200 |
| 2004/0019801 | A1 * | 1/2004 | Lindholm et al. | 713/200 |
| 2005/0091355 | A1 * | 4/2005 | Keohane et al. | 709/223 |
| 2005/0135625 | A1 * | 6/2005 | Tanizawa et al. | 380/270 |
| 2005/0138019 | A1 * | 6/2005 | Betts et al. | 707/3 |
| 2005/0154921 | A1 * | 7/2005 | Medvinsky | 713/201 |
| 2005/0198351 | A1 * | 9/2005 | Nog et al. | 709/232 |
| 2005/0216730 | A1 * | 9/2005 | Morino et al. | 713/153 |
| 2006/0112188 | A1 * | 5/2006 | Albanese et al. | 709/238 |
| 2006/0156403 | A1 * | 7/2006 | Haeffele et al. | 726/23 |
| 2007/0079117 | A1 * | 4/2007 | Bhogal et al. | 713/160 |
| 2007/0113266 | A1 * | 5/2007 | Ross et al. | 726/1 |
| 2008/0119177 | A1 * | 5/2008 | Hovnanian et al. | 455/414.2 |

FOREIGN PATENT DOCUMENTS

| | | |
|---|---|---|
| EP | 0 375 138 A2 | 6/1990 |
| WO | 03/098409 A1 | 11/2003 |

OTHER PUBLICATIONS

Petrovic et al. "Content-based routing in mobile ad hoc networks", Mobile and Ubiquitous Systems: Networking and Services, 2005. MobiQuitous 2005. The Second Annual International Conference on, Issue Date: Jul. 17-21, 2005, On pp. 45-55.*

* cited by examiner

*Primary Examiner* — Thanhnga B Truong
*Assistant Examiner* — Morshed Mehedi

(57) ABSTRACT

Content Based Routing with High Assurance MLS (multi-level security) methods and systems are described. In an embodiment, a security component receives content from a content provider. The security component can identify a security level of content metadata located within the content received from the content provider. A content router can receive a content descriptor from the content provider and an interest profile from a requesting system. The content router can utilize algorithms to create routing tables based on metadata in the content descriptor, and the interest profile. The content router can provide the content metadata to the requesting system based on the interest profile. A content filter can filter or sanitize the content metadata according to a security level of the requesting system before providing the content metadata to the requesting system.

12 Claims, 4 Drawing Sheets

CONTENT BASED ROUTING WITH HIGH ASSURANCE MLS

TECHNICAL FIELD

The present disclosure relates to content based routing with high assurance MLS (multi-level security).

BACKGROUND

Providing specific content to a requesting system, such as any system that requires inputs from an external source, over a network in a timely and secure manner requires knowledge of the interests of the requesting system, the security level of the information being sent over the network, and the security level of the network on which the requesting system resides. Conventional network communications are problematic because they can not provide specific metadata or content to a requesting system even if the requesting system is at the appropriate security level. Conventional network communications can only provide the entire data packets of information classified at the highest security level of any content contained within the entire data packets. Conventional network communications also can not individually classify the metadata or content within data packets at a specific security level to provide the requesting system with the specific content requested.

SUMMARY

This summary introduces simplified features and concepts of content based routing with high assurance MLS (multi-level security) which are further described below in the Detailed Description. This summary is not intended to identify essential features of the claimed subject matter, nor is it intended for use in determining the scope of the claimed subject matter.

In an embodiment of content based routing with high assurance MLS, a security component receives content from a content provider. The security component identifies a security level of content metadata located within the content received from the content provider. A content router receives a content descriptor from the content provider and an interest profile from a requesting system. The content router utilizes algorithms to create routing tables based on metadata in the content descriptor, and the interest profile. The content router provides the content metadata to the requesting system based on the interest profile. A content filter filters or sanitizes the content metadata according to a security level of the requesting system before providing the content metadata to the requesting system.

BRIEF DESCRIPTION OF THE DRAWINGS

Embodiments of content based routing with high assurance MLS (multi-level security) are described with reference to the following drawings. The same numbers are used throughout the drawings to reference like features and components.

DETAILED DESCRIPTION

Content Based Routing with High Assurance MLS (multi-level security) methods and systems are described in which embodiments provide communication of content from a content provider to a requesting system, such as any system that requires inputs from an external source. Embodiments of content based routing with high assurance MLS can also be implemented to assist in providing content to the requesting system from the content provider.

In one embodiment, a security component receives content from a content provider. The security component can identify a security level of content metadata located within the content received from the content provider. A content router receives a content descriptor from the content provider and an interest profile from a requesting system. The content router can utilize algorithms to create routing tables based on metadata in the content descriptor, and the interest profile. The content router can provide the content metadata to the requesting system based on the interest profile. A content filter can filter and/or sanitize the content metadata according to a security level of the requesting system before providing the content metadata to the requesting system.

While features and concepts of the described systems and methods for content based routing with high assurance MLS can be implemented in any number of different environments, systems, and/or other configurations, embodiments of content based routing with high assurance MLS are described in the context of the following exemplary environment and system architectures.

Figure 1:
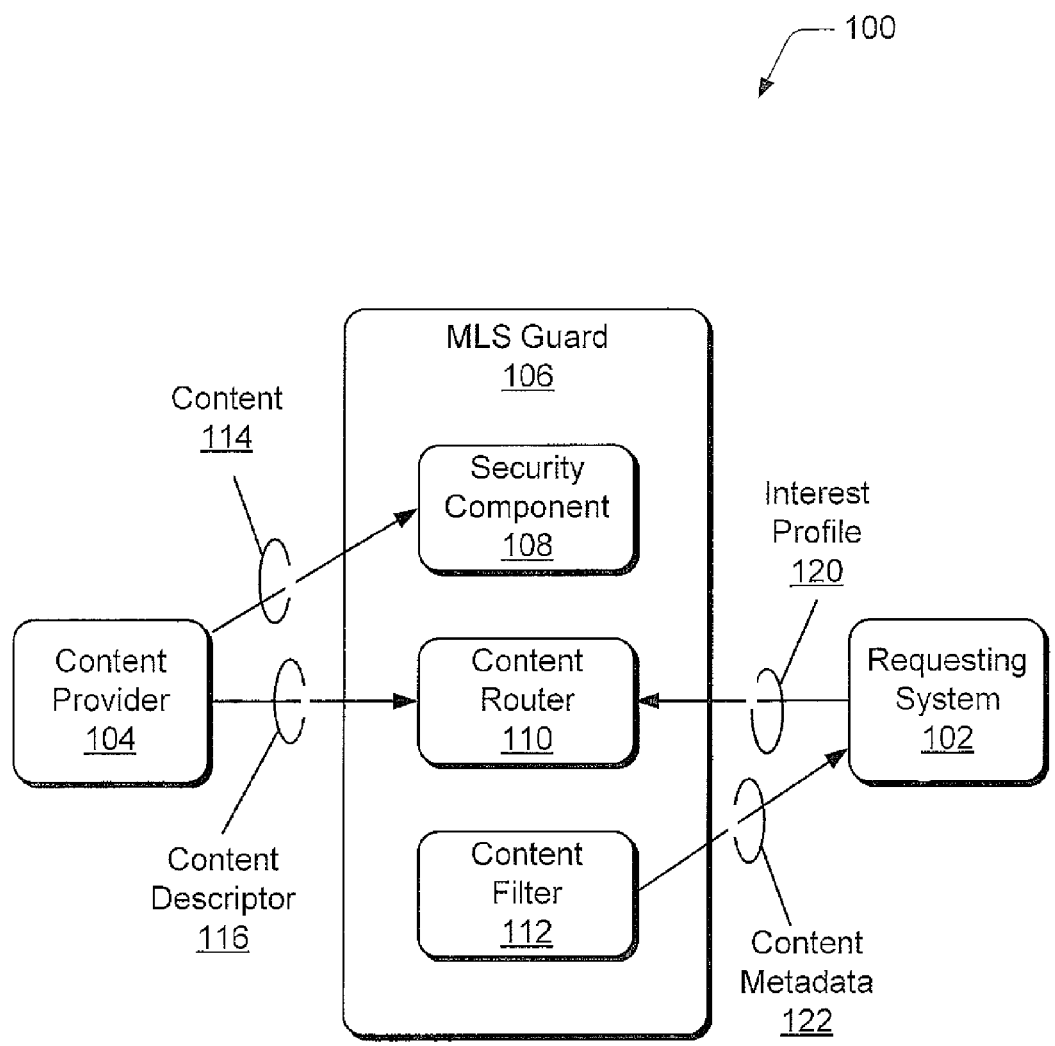
FIG. 1 illustrates an example system in which embodiments of content based routing with high assurance MLS can be implemented.

FIG. 1 illustrates an example system 100 in which embodiments of content based routing with high assurance MLS can be implemented. The system 100 includes a requesting system 102, such as any system that requires inputs from an external source like a data fusion engine, a content provider 104, a MLS guard 106, a security component 101, a content router 110, and a content filter 112 to filter and/or sanitize content metadata 122 located within the content 114 and provide the content metadata 122 to the requesting system 102. In this example, the content router 110 can receive an interest profile 120 from the requesting system 102, and a content descriptor 116 from the content provider 104.

The requesting system 102, such as any system that requires inputs from an external source, can communicate an interest profile 120 to the content router 110. The requesting system 102 can receive content metadata 122 from the content filter 112 after it is filtered and/or sanitized according to a security level of the requesting system 102. In this example, the security level of the requesting system 102 is equivalent to the security level of a network on which the requesting system 102 is located. Further, in this example, the interest profile 120 defines the desired content and/or metadata. In an embodiment, the content router 110 can provide the content metadata 122 directly to the requesting system 102 in an event that the security level of the content metadata 122 is not higher than the security level of the requesting system 102. In another example, the requesting system 102 can be a subscriber in a service oriented architecture environment. In another embodiment, the requesting system 102 can receive the content 114 and/or the content metadata 122.

The content provider 104 can communicate a content descriptor 116 to the content router 110, and communicate content 114 to the security component 108. In this example, the content 114 can be at least one of readable text, XML data or binary data. Further, in this example, the content descriptor defines the provided content and/or metadata. In another example, the content descriptor is a publisher in a service oriented architecture environment. In an embodiment, at least one additional content provider can communicate a content descriptor to the content router 110, and communicate content 114 to the security component 108.

The security component 108 can receive content 114 from the content provider 104 and can identify a security level of the content metadata 122 received from the content provider 104. The security component 108 can identify the security level of the content metadata 122 based on a security classification that is defined in a classification guide. The security component 108 can identify or tag the content metadata 122 manually, or use a variety of identifiers or taggers that can place a security classification on the content metadata 122. The security component 108 can utilize a security protocol to communicate the content metadata 122 to the content router 110.

The content router 110 can receive the content descriptor 116 from the content provider 104 and the interest profile 120 from the requesting system 102. The content router can utilize algorithms to create routing tables based on the metadata in the content descriptor 116, and the interest profile 120, and provide the content metadata 122 to the requesting system 102 based on the interest profile 120. Further, in this embodiment, the content metadata 122 will be multicast to interested requesting systems 102 or subscribers whose interest profile 120 matches the metadata content 122 in the content descriptor 116.

The content filter 112 can filter and/or sanitize the content metadata 122 according to a level of security of the requesting system 102 before providing the content metadata 122 to the requesting system 102. The content filter 112 can utilize MLS guard policies to filter and/or sanitize the content metadata 122 according to the security level of the requesting system 102.

In an embodiment, the security component 108, content router 110, and content filter 112 can be housed within a multi-level security hardware system, such as an MLS Guard 106. The MLS guard 106 can provide two-way communications and can communicate content metadata 122 from a content provider 104 at a low security level to a requesting system 102 at a high security level, and from a content provider 104 at a high security level to requesting system 102 at a low security level. Further, in this embodiment, the MLS guard 106 can operate at the highest level of assurance or the highest evaluation accreditation level such as common criteria EAL7.

Figure 2:
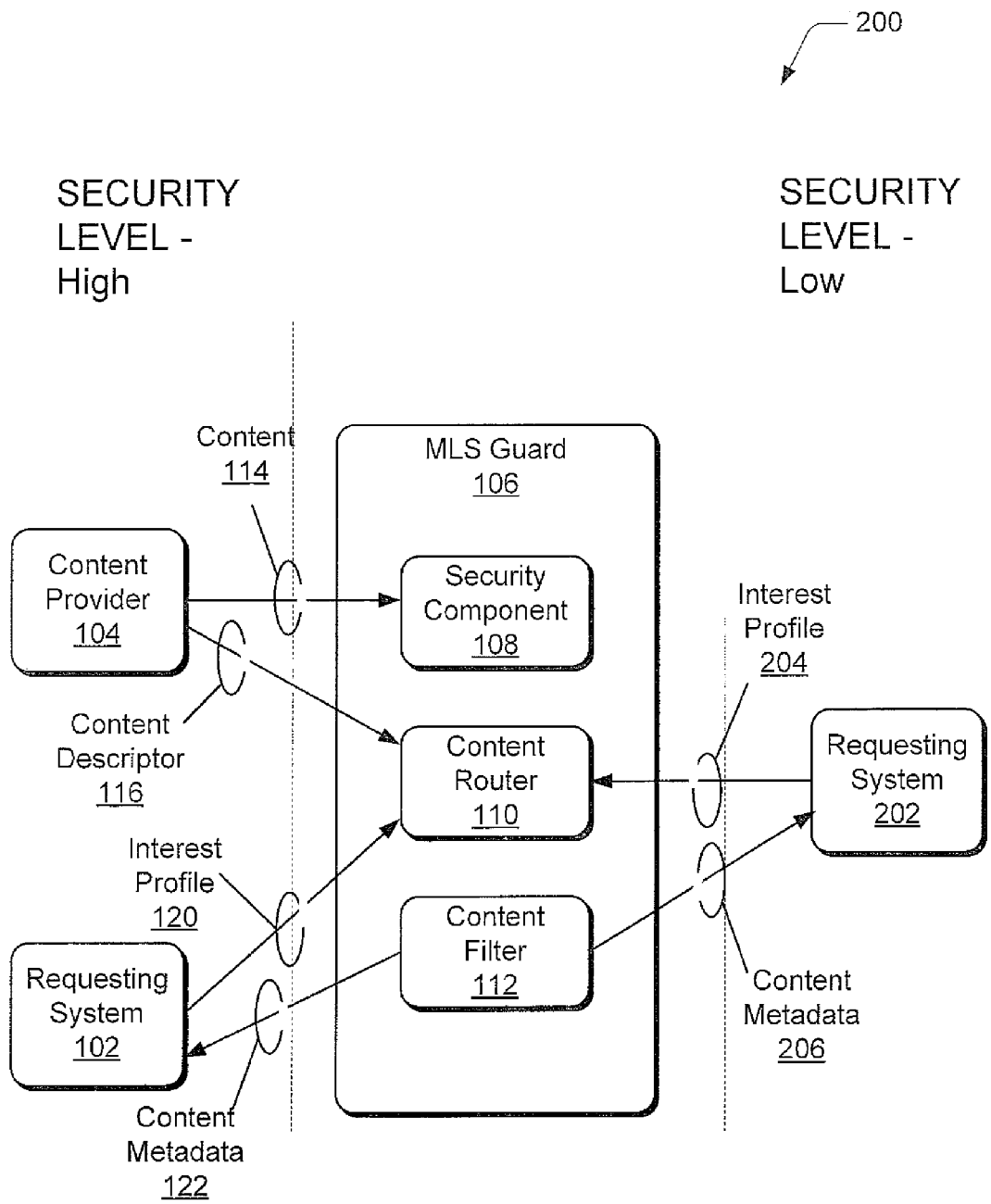
FIG. 2 illustrates another example system in which embodiments of content based routing with high assurance MLS can be implemented.

FIG. 2 further illustrates an example system 200 in which embodiments of content based routing with high assurance MLS can be implemented. The system 200 includes the requesting system 102, the content provider 104, the MLS guard 106, the security component 108, the content router 110, at least one additional requesting system 202, and the content filter 112 as described above with reference to FIG. 1 to filter and/or sanitize content metadata 122 and provide the content metadata 122 to the requesting system 102.

In this example, the at least one additional requesting system 202 can communicate an interest profile 204 to the content router 110. The content router 110 can create routing tables based on the interest profile of the at least one additional requesting system 202 and the metadata in the content descriptor 116 of each content provider 104, and provide content metadata 206 to the at least one additional requesting system 202 based on the interest profile 204. Further, in this embodiment, the content filter 112 can filter and/or sanitize the content metadata 206 according to a security level of the at least one additional requesting system 202 before the content metadata 206 is received by the at least one additional requesting system 202. Also, in this embodiment, these operations described can be simultaneously performed with the functions as described in FIG. 1.

Generally, any of the functions and methods described herein can be implemented using hardware, software, firmware (e.g., fixed logic circuitry), manual processing, or any combination thereof. A software implementation represents program code that performs specified tasks when executed on a computing-based processor. Example method 300 described with reference to FIG. 3 may be described in the general context of computer executable instructions. Generally, computer executable instructions can include services, applications, routines, programs, objects, components, data structures, procedures, modules, functions, and the like that perform particular functions or implement particular abstract data types.

Figure 3:
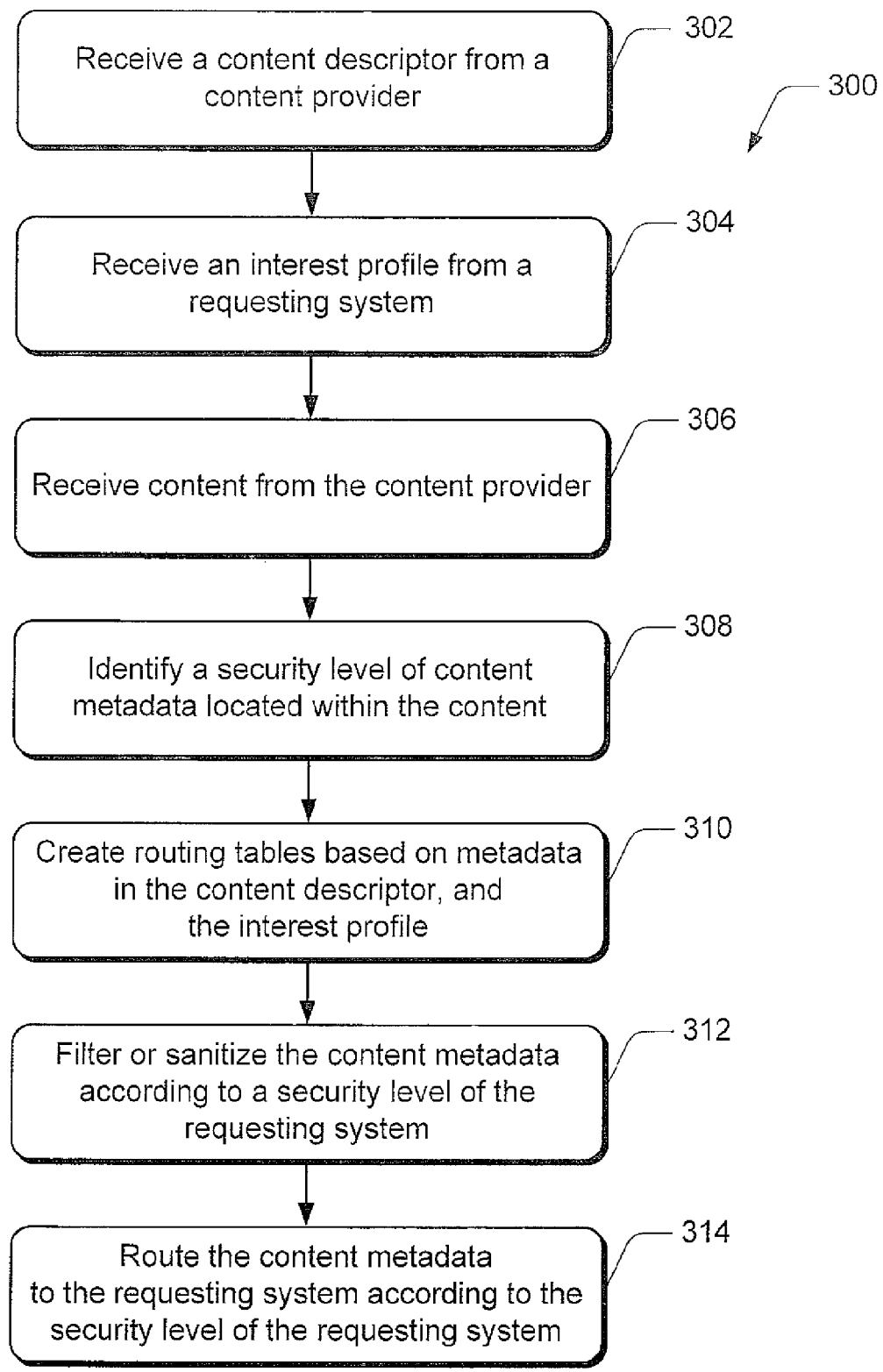
FIG. 3 illustrates exemplary method(s) for content based routing with high assurance MLS.

FIG. 3 illustrates an exemplary method 300 for content based routing with high assurance MLS and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, a content descriptor 116 is received from a content provider 104. For example, the content router 110 receives the content descriptor 116 from the content provider 104. At block 304, an interest profile 120 is received from a requesting system 102. For example, the content router 110 receives the interest profile 120 from the requesting system 102. At block 306, content 114 is received from the content provider 104. For example, the security component 108 receives the content 114 from the content provider 104. At block 308, the security level of the content metadata 122 located within the content 114 is identified. For example, the security component 108 identifies the security level of the content metadata 122. In an embodiment, the security component 108 identifies the security level of the content metadata 122 based on a security classification that is defined in a classification guide. In another embodiment, the content metadata 122 is directly received by the requesting system 102 in an event that a security level of the content metadata 122 is not higher than the security level of the requesting system 102. At block 310, routing tables are created based on metadata in the content descriptor 116, and the interest profile 120. For example, the content router 110 creates routing tables based on the metadata in the content descriptor 116, and the interest profile 120. At block 312, the content metadata 122 is filtered and/or sanitized according to a security level of the requesting system 102. For example, the content filter 112 filters and/or sanitizes the content metadata 122 according to the security level of the requesting, system 102. At block 314, the content metadata 122 is routed to the requesting system 102 according to the security level of the requesting system 102. For example, the content filter 112 routes the content metadata 122 to the requesting system 102 according to the security level of the requesting system 102.

Figure 4:
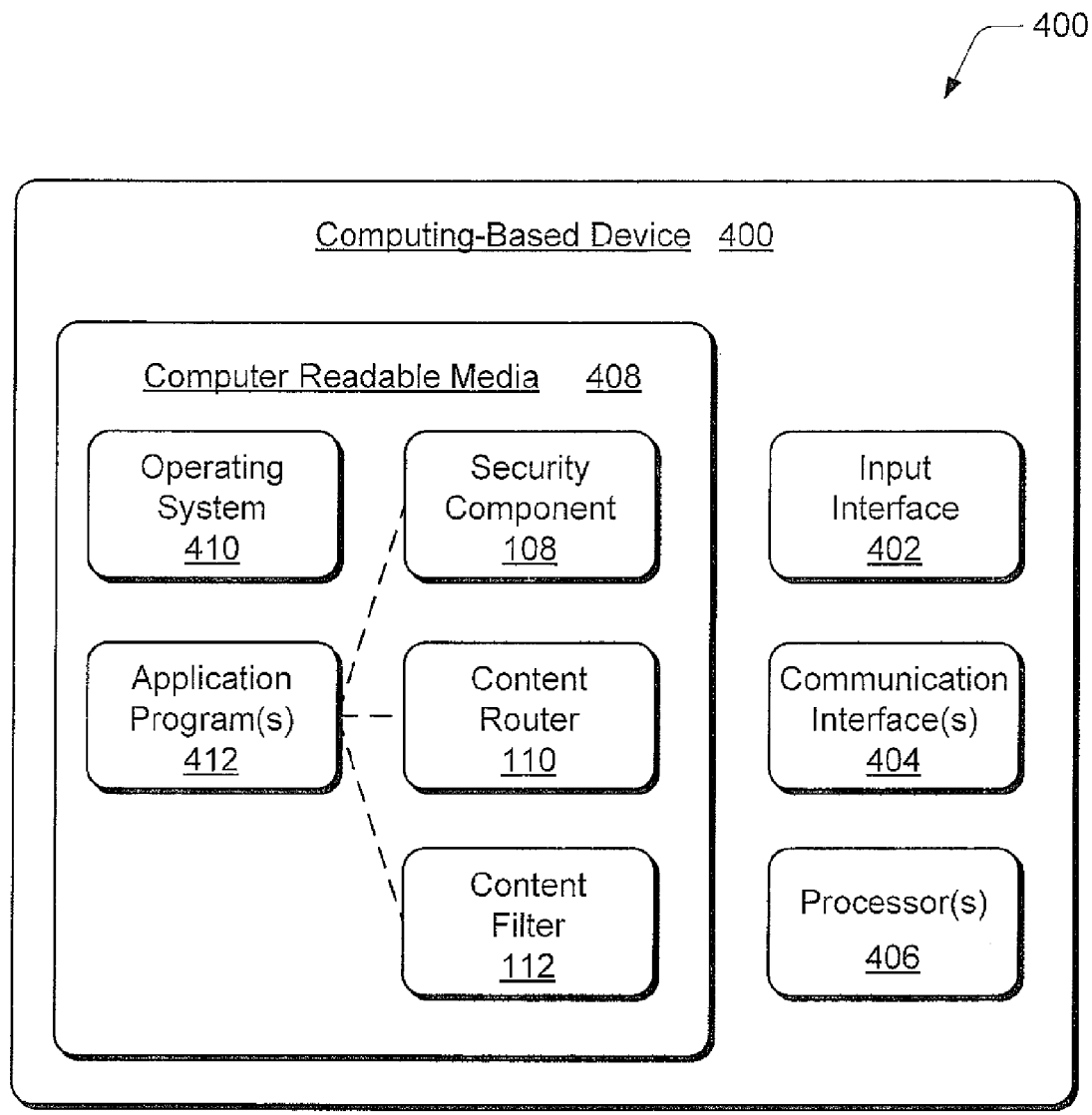
FIG. 4 illustrates am example computing-based device in which embodiments of content based routing with high assurance MLS can be implemented.

FIG. 4 illustrates an example computing-based device 400 which can be implemented as any form of computing or electronic device in which embodiments of content based routing with high assurance MLS can be implemented. For example, the computing-based device 400 can be implemented to include any one or combination of devices described with reference to the system shown in FIG. 1.

The computing-based device 400 includes an input interface 402 by which data inputs can be received. Device 400 further includes communication interface(s) 404 which can be implemented as any one or more of a wireless interface, any type of network interface, and as any other type of communication interface. The computing-based device 400 also includes one or more processors 406 (e.g., any of microprocessors, controllers, and the like) which process various computer executable instructions to control the operation of computing-based device 400, to communicate with other electronic and computing devices, and to implement embodiments of content based routing with high assurance MLS. Computing-based device 400 can also be implemented with computer readable media 408, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 408 provides data storage mechanisms to store various information and/or data such as software applications and any other types of information and data related to operational aspects of computing-based device 400. For example, an operating system 410 and/or other application programs 412 can be maintained as software applications with the computer readable media 408 and executed on processor(s) 406 to implement embodiments of content based routing with high assurance MLS. For example, the security component 108, the content router 110, and the content filter 112 can each be implemented as a software application and/or component in various embodiments of content based routing with high assurance MLS.

In addition, although the security component 108, content router 110, and content filter 112 can each be implemented as separate application components, each of the components can themselves be implemented as several component modules or applications distributed to each perform one or more functions in a content based routing with high assurance MLS system. Further, any combination of the security component 108, content router 110, and content filter 112 can be implemented in an alternate embodiment.

Although embodiments of content based routing with high assurance MLS have been described in language specific to structural features and/or methods, it is to be understood that the subject of the appended claims is not necessarily limited to the specific features or methods described. Rather, the specific features and methods are disclosed as exemplary implementations of content based routing with high assurance MLS.

The invention claimed is:

1. A machine comprising:
an interface configured to communicate with a plurality of networks having different security levels; and
at least one hardware processor programmed to process publisher-provided content and content descriptors and subscriber-supplied interest profiles received from the interface,
wherein the processor creates content-based routing tables based on metadata in the publisher-provided content received; and
uses the content descriptors and interest profiles to look up a node of a target network in the content-based routing tables and forward data in received content to the node, while ensuring compliance with classified data rules and policies of the target network by using the policies to determine what can and can't be forwarded to the target network based on security classifications.

2. The machine recited in claim 1, wherein the at least one processor is further programmed to provide the data directly to the node in an event that the security level of the data not higher than the security level of the target network.

3. The machine recited in claim 1, wherein the at least one processor is further programmed to identify the security level of the data based on a security classification that is defined in a classification guide.

4. The machine recited in claim 1, wherein the content and the content metadata is at least one of readable text or XML data.

5. A machine comprising:
an interface configured to communicate with a plurality of networks having different security levels, the interface receiving content, content descriptors, and content metadata from publishers via the plurality of networks; and
at least one hardware processor programmed to implement both a content-based router and a multi-level security guard for classified data,
wherein the processor creates content-based routing tables based on metadata in the received content; and
uses the content descriptors and subscriber-supplied interest profiles to look up nodes of a target network in the content-based routing tables to forward data in received content to subscribers of target networks,
while ensuring compliance with rules and policies of the target networks by using the policies to determine what can and can't be forwarded to the target network based on security classifications.

6. The machine recited in claim 5, wherein the data is classified at a security level that is defined in a classification guide.

7. The machine of claim 1, wherein the at least one processor ensures compliance with the data rules of the target network by determining whether the data is passed, filtered, or sanitized.

8. The machine of claim 1, wherein the machine is configured for a publish/subscribe network architecture, and wherein requests for specific content are made by subscribers.

9. The machine of claim 1, wherein the at least one processor is programmed to implement an MLS guard, whereby the MLS guard receives routed data and ensures that the routed data complies with rules and policies of the target network.

10. The machine recited in claim 5 wherein the data is forwarded directly to a subscriber if security level of the data is not higher than the security level of the subscriber's target network.

11. The machine of claim 5, wherein the at least one processor ensures compliance with the rules of the target networks by using the rules to determine whether the data is passed, filtered, or sanitized.

12. The machine of claim 11, wherein the at least one processor is programmed data to sanitize the data to ensure compliance with the rules of the target networks.

* * * * *